(12) United States Patent
Bradley

(10) Patent No.: US 12,301,269 B2
(45) Date of Patent: May 13, 2025

(54) SELF-TUNING RF LINK

(71) Applicant: Anritsu Company, Morgan Hill, CA (US)

(72) Inventor: Donald Anthony Bradley, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 442 days.

(21) Appl. No.: 17/741,832

(22) Filed: May 11, 2022

(65) Prior Publication Data

US 2023/0370102 A1    Nov. 16, 2023

(51) Int. Cl.
*H04B 1/10* (2006.01)
*H04B 1/00* (2006.01)

(52) U.S. Cl.
CPC ......... *H04B 1/1027* (2013.01); *H04B 1/0057* (2013.01); *H04B 2001/1072* (2013.01)

(58) Field of Classification Search
CPC ............... H04B 1/1027; H04B 1/0057; H04B 2001/1072; H04B 1/30; H04B 1/26; H04B 7/08; H04B 1/70712; H04B 1/40; H04L 27/14; H04L 7/033; H04L 2027/0016; H04L 27/2647; H03D 3/00; H03D 3/009; H03D 1/2254; H03D 3/002; H03D 1/24; H04W 52/52; H04W 88/02; H03G 3/3068; H03F 3/211; H03F 3/68

See application file for complete search history.

(56) References Cited

U.S. PATENT DOCUMENTS

| | | | | |
|---|---|---|---|---|
| 6,205,183 B1 * | 3/2001 | Dent | ...................... | H03D 7/165 |
| 2013/0287077 A1 * | 10/2013 | Fernando | ............... | H04B 1/005 |
| 2014/0266420 A1 * | 9/2014 | Brown | ...................... | H03F 1/08 |
| 2018/0026673 A1 * | 1/2018 | Kim | ......................... | H04B 1/30 |
| 2020/0136663 A1 * | 4/2020 | Shanan | ................... | H04B 1/40 |
| 2022/0190950 A1 * | 6/2022 | Leung | .................. | H04B 1/1027 |

OTHER PUBLICATIONS

Analog Devices, Millimeterwave Receiver, 57 GHz to 64 Ghz, HMC6301, Analog Devices, Inc., Norwood, MA, pp. 1-24 (Jul. 2016).

(Continued)

*Primary Examiner* — Lana N Le
(74) *Attorney, Agent, or Firm* — Kilpatrick Townsend & Stockton LLP

(57) ABSTRACT

RF receivers having self-tuning capabilities. An example can provide self-tuning by detecting a first envelope of a first demodulated output signal and a second envelope of a second demodulated output signal. A difference between the detected envelopes can be filtered to generate a control signal. The control signal can be applied to a voltage-controlled crystal oscillator. In-phase and quadrature outputs of the voltage-controlled crystal oscillator can be used to demodulate a received signal to demodulate in-phase and quadrature signals. Loop gain dependency on input signal amplitude can be reduced by using logarithmic amplifiers after the envelope detectors, or by replacing the envelope detectors and logarithmic amplifiers with demodulating logarithmic amplifiers.

16 Claims, 10 Drawing Sheets

(56) References Cited

OTHER PUBLICATIONS

Analog Devices, 60 GHz Millimeterwave Transmitter, 57 GHz to 64 Ghz, HMC6300, Analog Devices, Inc., Norwood, MA, pp. 1-25, (Jun. 2017).

Athanasopoulos, Nikolaos et al., "A 60 GHz Planar Diplexer Based on Substrate Integrated Waveguide Technology," Hindawi Publishing Corporation Active and Passive Electronic Components vol. 2013, Article ID 948217, six pages, Jan. 2013).

"Transceiver Chips Corral MM Waves," Analog Devices, Inc. pp. 1-7, (1995-2021) The year of publication is sufficiently earlier than the effective U.S. filing date and any foreign priority date so that the particular month of publication is not in issue.

Ashiq, Irfan et al., "A Novel Ultra-Broadband DC-36-to-66-GHz Hybrid Diplexer Using Waveguide and SSL Technology," Proceedings of the 44th European Microwave Conference, Microwave Components, National Instruments, Santa Clara, CA USA, IEEE Xplore, pp. 1111-1114, Rome, Italy (Oct. 6-9, 2014).

"Electromagnetic compatibility and Radio spectrum Matters (ERM); Technical characteristics of multiple gigabit wireless systems in the 60GHz range System Reference Document," ETSI TR 102 555 v.1.1.1, pp. 1-21, Sophia Antipolis Cedex, France (Feb. 2007), Technical Report.

Analog Devices, 1 MHz to 8 GHZ, 70 dB Logarithmic Detector/Controller, AD8318, Analog Devices, Inc., Norwood, MA, pp. 1-24, www.analog.com (Jul. 2004).

Admin. "What is the actual maximum throughput on Gigabit Ethernet?" pp. 1-6 www.gigabit-wireless.com (Jan. 23, 2018).

\* cited by examiner in # SELF-TUNING RF LINK

BACKGROUND

Myriad networking architectures are available for use in sending data among two or more computers, servers, networks, and other computing devices and systems. A common example can include Wi-Fi connections. But these can be limited in the distance over which they can operate and are often not suited for transmission between buildings, for example at an industrial campus. Cellular connections can traverse sufficient distances, but can have a long latency, weak security, and other limitations.

In many situations, a point-to-point or local-area network (LAN) can deliver data between or among buildings with a low latency. These point-to-point or LAN connections can be wired connections, for example using shielded-twisted pairs, unshielded twisted pairs, or other types of conduits. These point-to-point or LAN connections can be implemented using fiber-optic cables, infra-red data transmission, or other light-based signaling methods or apparatus.

In some circumstances, obstacles, obstructions, or other factors might make using twisted pairs or fiber-optic connections difficult. For example, two buildings might be spaced far enough apart, or might have intervening contours or structures, such as rivers or freeways, that complicate the routing of a physical connection. These and other structures, such as intervening buildings, can prevent the use of infra-red and other communication methods.

As a result, it can be desirable to use low-power radio-frequency (RF) links to connect two or more computers, servers, networks, and other computing devices and systems together. These RF links can include a transmitting circuit to transmit RF data and a receiving circuit to receive the RF data. But it can be difficult to maintain a connection between networks using an RF link. For example, excess latency and drop-out in the RF link can break a data connection between a transmitter and a receiver.

Also, it can be difficult for a receiving circuit to tune its frequency of operation to the frequency of operation of the transmitting circuit. It can also be desirable that the receiving circuit be able to tune itself to compensate for drift, thermal effects, and other time-variant disturbances.

Thus, what is needed are circuits, methods, and apparatus that can provide RF links having minimal latency and RF receivers having self-tuning capabilities.

SUMMARY

Accordingly, embodiments of the present invention can provide point-to-point network connections having an RF link with minimal latency and RF receivers having self-tuning capabilities. For example, a first network or network portion at a first location can wirelessly connect to a second network or network portion at a second location. Devices on each network or network portion can communicate using one of the universal serial bus (USB) standards, such as USB 2, USB 3, USB 4, or other standard or proprietary signal protocol. But this can make implementing a wireless link between the first network or network portion and the second network or network portion difficult to implement. For example, an excess amount of latency or dropout can cause a break in the RF link connection. This amount of excess latency can be as short as more than one bit-time.

To reduce latency, these and other embodiments of the present invention can implement fully transparent data transmission. To achieve full transparency, data can be translated between USB 2.0 data and fiber-optic data. The translation to fiber-optic data can provide data having a data rate and a modulation that can also be used by the RF link, thereby reducing the latency that could otherwise occur if the data needed to be translated to a different data rate or modulation scheme. The RF link can also utilize the same packet structure as the fiber-optic data, thereby greatly reducing the latency that could otherwise be caused by the necessity of reformatting data.

An example of such a technology that can be used to implement the RF link is Free Space Optics (FSO.) Such an RF link can be capable of using the same modulation techniques for wireless transmission and fiber-optic transmission. Such a link can further employ the same data rate, for example 1.25 Gbps, and the same packet structure for wireless transmission as for fiber-optic transmission. This can provide transparent transmission that is has a predictable throughput and very low latency. For example, the latency can be as low as one bit time. The use of a transparent wireless link can allow data to readily be provided from the first network or network portion to the second network or network portion.

In one specific example, a transmit path can include a data conversion circuit that translates data used in a first computing device, network, or other electronic system. The data to be translated can be compliant with USB 2.0 or other standard or proprietary signal protocol. The translated data can be up-converted to in-phase and quadrature signals that can be provided to a diplex or other structure for wireless transmission. A corresponding receive path can be configured to receive the data from another diplex or other structure. The receive path can include a zero-degree phase splitter. The received in-phase and quadrature RF signals can be demodulated using mixers and filtered using low-pass filters. Data can be extracted from the demodulated signals and provided for translation for a second computing device, network, or other electronic system.

These and other embodiments of the present invention can provide a transmit path from the first computing device, network, or other electronic system. The transmit path can have a USB-to-fiber converter followed by a fiber transmitter. The fiber transmitter can transmit data over a first fiber-optic cable. Instead of routing the fiber-optic cable to the second computing device, network, or other electronic system, the first fiber-optic cable can provide data to a fiber-optic receiver. The fiber-optic receiver can then provide the data to an RF transmitter, which can up-convert the received data to in-phase and quadrature signals that can be provided to a diplex or other structure for transmission.

A corresponding receive path can be configured to receive the data from another diplex or other structure. The receive path can include a zero-degree phase splitter followed by mixers to generate first and second demodulated output signals. Data can be extracted by adding or combining the first and second demodulated output signals. The data can then be provided to a fiber-optic transmitter. As before, this can be achieved using a transparent wireless link. The fiber-optic transmitter can provide data over a second fiber-optic cable to a fiber-optic receiver. The fiber-optic receiver can provide the data to a data converter, which can then convert and provide the data to the second computing device, network, or other electronic system.

These and other embodiments of the present invention can further provide RF receivers having self-tuning capabilities. An illustrative embodiment of the present invention can provide self-tuning of a receiver by detecting a first envelope of a first demodulated output signal and a second envelope of a second demodulated output signal. A difference between the detected envelopes can be filtered and used to generate a control signal. The control signal can be applied to a voltage-controlled crystal oscillator. In-phase and quadrature outputs of the voltage-controlled crystal oscillator can be used to demodulate a received signal to generate the first and second demodulated output signals.

When a frequency of in-phase and quadrature outputs of the voltage-controlled crystal oscillator in a transmitter mismatches a frequency of in-phase and quadrature outputs of the voltage-controlled crystal oscillator in a receiver, the demodulated output waveform can be modulated by a beat frequency, where the beat frequency is the difference in frequency between the receiver local oscillator and the transmitter local oscillator. Accordingly, embodiments of the present invention can provide a feedback loop to adjust the frequency of in-phase and quadrature outputs of the voltage-controlled crystal oscillator in the receiver to match the corresponding signals in the transmitter. When these frequencies of the local oscillators in the receiver and the transmitter match, the beat frequency goes to zero. The loop gain when the beat frequency is at zero can be dependent on the amplitude of the envelope of the demodulated waveform, which can be referred to as the beat frequency waveform. That is, the higher the received amplitude, the higher the loop gain. A high loop gain can make the loop unstable and prone to overshooting and oscillations. A low loop gain can undesirably increase loop response time. Accordingly, embodiments of the present invention can include one or more circuit, methods, or apparatus to reduce this sensitivity to the amplitude of the envelope of the demodulated waveform.

More specifically, when a frequency of a local-oscillator signal of a receiver mismatches a frequency of local-oscillator signal of a transmitter, the demodulated output waveform can be modulated by the beat frequency that is the difference in frequency between the receiver local oscillator and the transmitter local oscillator. In a quadrature receiver, both a first demodulated output signal and a second demodulated output signal can be modulated by the beat or difference frequency. This modulation can be detected using envelope detectors that receive the first and second demodulated outputs. A difference between the detected envelope of the first and second demodulated outputs can be taken and used to generate a control signal. The control signal can be provided to the voltage-controlled crystal oscillator in order to adjust the frequency of the of the receiver local-oscillator signal to match the transmitter local-oscillator signal.

In this configuration, the self-tuning feedback loop can be from the in-phase and quadrature outputs of the voltage-controlled crystal oscillator, through input in-phase and quadrature mixers, through the envelope detectors, to the voltage-controlled crystal oscillator. The gain of this feedback loop can be dependent the amplitude of the first and second demodulated output signals, which in turn are proportional to the amplitude of the received signal. Accordingly, to compensate for this amplitude dependency, these and other embodiments of the present invention can include a variable-gain amplifier or other circuit in the feedback loop. For example, a variable-gain amplifier can be inserted in the input signal receive path. This variable-gain amplifier can gain an input signal to a set level that is provided to in-phase and quadrature mixers in the input path. Variable-gain amplifiers can be placed after the mixers and between the mixers and the envelope detectors. Variable-gain amplifiers can be placed after the envelope detectors.

In these and other embodiments of the present invention, other circuits can be used instead of envelope detectors and variable-gain amplifiers. For example, logarithmic amplifiers can be connected after the envelope detectors. That is, a first logarithmic amplifier can follow a first envelope detector for the first demodulated output signal and a second logarithmic amplifier can follow a second envelope detector for the second demodulated output signal. These logarithmic amplifiers can be simple, p-n junction-based amplifiers. The logarithmic amplifiers can provide the logarithm of the outputs of the envelope detectors.

The difference between two logarithmic outputs is the logarithm of the ratio of the two outputs. In this circuit, the difference between the outputs of the two logarithmic amplifiers can be equal to the logarithm of the ratio of the first demodulated output signal and the second demodulated output signal. These and other embodiments of the present invention can utilize this by subtracting one of the outputs of the logarithmic amplifiers from the other. Since the amplitude of the first demodulated output signal and the second demodulated output signals can both similarly track the amplitude of the input signal, their ratio, and the logarithm of their ratio, can be substantially independent of the amplitude of the input signal. The difference in the outputs of the logarithmic amplifiers can thus be an amplitude-independent signal that can generate a control signal used to adjust a frequency of the voltage-controlled crystal oscillator.

In these and other embodiments of the present invention, demodulating logarithmic amplifiers can be used in place of envelope detectors and logarithmic amplifiers. These demodulating logarithmic amplifiers can be cascaded amplifiers configured to provide successive compression. These demodulating logarithmic amplifiers can be more complicated than the simpler p-n junction-based amplifiers used with the envelope detectors. The demodulating logarithmic amplifiers can convert the first and second demodulated output signals to decibel-scaled output voltages. Again, since the amplitude of the first demodulated output signal and the second demodulated output signals can both similarly track the amplitude of the input signal, their ratio, and the logarithm of their ratio, can be substantially independent of the amplitude of the input signal. The difference in the outputs of the demodulating logarithmic amplifiers can thus be an amplitude-independent signal that can generate a control signal used to adjust a frequency of the voltage-controlled crystal oscillator.

These and other embodiments of the present invention can provide circuitry for generating a control signal to be applied to a crystal of a voltage-controlled crystal oscillator. The control circuitry can receive a difference signal from a first and second demodulated signal paths. The control circuitry can include a zero, such as a resistor and capacitor coupled in series around an amplifier, where the amplifier provides the control voltage to the crystal. The resistor, capacitor, and amplifier can form a zero to cancel one of the two poles in the feedback loop, thereby helping to stabilize the loop, where the two poles include the local oscillator and either the envelope detector or the demodulating logarithmic amplifier, depending on implementation.

These and other embodiments of the present invention can provide a received data output. The received data output can be generated by adding or combining the first demodulated output signal and the second demodulated output signal. The first demodulated output signal and the second demodulated output signal can be in-phase signals with the same content. Since the noise between them can be uncorrelated, adding them can increase the signal-to-noise ratio at the output of a summing circuit. The resulting sum can be AC coupled or otherwise provided to a high-pass filter. The output of the high-pass filter can be received by a comparator, which can in turn provide the data output.

These and other embodiments of the present invention can also provide a received-signal-strength indication or RSSI output. An RSSI output can be used in aligning a receiving antenna to a radio source. That is, a receiving antenna can be pointed towards a radio source and positioned to find a maximum RSSI output amplitude. This aligning can be used to ensure that the strongest signal is received for the lowest bit error rate (BER.) In these and other embodiments of the present invention, the outputs of logarithmic amplifiers that follow envelope detectors can be added together. This sum is thus the logarithm of the products of the detected envelopes, which can be used as an RSSI signal. Similarly, the outputs of demodulating logarithmic amplifiers can be added and their sum can be used as an RSSI signal.

These and other embodiments of the present invention can provide point-to-point communications for various types of systems. For example, a transmit path can include a data conversion circuit that translates data used in a first computing device, network, or other electronic system. The data to be translated can be compliant with one of the universal serial bus standards, such as USB 2, USB 3, USB 4, or other standard or proprietary signal protocol. The translated data can be up-converted to in-phase and quadrature signals that can be provided to a diplex or other structure for transmission. A corresponding receive path can be configured to receive the data from another diplex or other structure. The receive path can include a zero-degree phase splitter. The received in-phase and quadrature RF signals can be demodulated using mixers and filtered using low-pass filters. Data can be extracted from the demodulated signals and provided for translation for a second computing device, network, or other electronic system.

These and other embodiments of the present invention can provide a transmit path from the first computing device, network, or other electronic system. The transmit path can have a USB-to-fiber converter followed by a fiber transmitter. The fiber transmitter can transmit data over a first fiber-optic cable. Instead of routing the fiber-optic cable to the second computing device, network, or other electronic system, the first fiber-optic cable can provide data to a fiber-optic receiver. The fiber-optic receiver can then provide the data to an RF transmitter, which can up-convert the received data to in-phase and quadrature signals that can be provided to a diplex or other structure for transmission.

In these and other embodiments of the present invention, wireless technologies can be utilized to form a transparent wireless link. An example of such a technology is Free Space Optics (FSO.) Such a link can be capable of using the same modulation techniques for wireless transmission and fiber-optic transmission. Such a link can further employ the same data rate, for example 1.25 Gbps, and packet structure for wireless transmission as for fiber-optic transmission. This can provide transparent transmission that is has a predictable throughput and very low latency. For example, the latency can be as low as one bit time. The use of a transparent wireless link can allow fiber-optic data to readily be provided from the fiber-optic receiver to the RF transmitter.

A corresponding receive path can be configured to receive the data from another diplex or other structure. The receive path can include a zero-degree phase splitter followed by mixers to generate first and second demodulated output signals. Data can be extracted by adding or combining the first and second demodulated output signals. The data can then be provided to a fiber-optic transmitter. As before, this can be achieved using a transparent wireless link. The fiber-optic transmitter can provide data over a second fiber-optic cable to a fiber-optic receiver. The fiber-optic receiver can provide the data to a data converter, which can then convert and provide the data to the second computing device, network, or other electronic system.

These and other embodiments of the present invention can employ one or more types of mixers. For example, some or all of the mixers can be double-balanced mixers, single-balanced mixers, ring-diode mixers, Gilbert multipliers, or other types of mixers. The local oscillators and other voltage-controlled oscillators can be ring oscillators, tank circuits, or other types of oscillators. The receivers and transmitters can be formed on a single integrated circuit, or they can be implemented as a combination of different circuits.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 6A illustrates waveforms in a feedback loop in the receiver of FIG. 4, while

FIG. 10A illustrates waveforms in a feedback loop in the receiver of FIG. 9, while

DESCRIPTION OF ILLUSTRATIVE EMBODIMENTS

These and other embodiments of the present invention can provide point-to-point communications for various types of systems. For example, a transmit path can include a data conversion circuit that translates data used in a first computing device, network, or other electronic system. The data to be translated can be compliant with one of the universal serial bus standards, such as USB 2, USB 3, USB 4, or other standard or proprietary signal protocol. The translated data can be up-converted to in-phase and quadrature signals that can be provided to a diplex or other structure for transmission. A corresponding receive path can be configured to receive the data from another diplex or other structure. The receive path can include a zero-degree phase-splitter, followed by mixers to generate demodulated signals. Data can be extracted from the demodulated signals and provided for translation for a second computing device, network, or other electronic system. An example is shown in the following figure.

Figure 1:
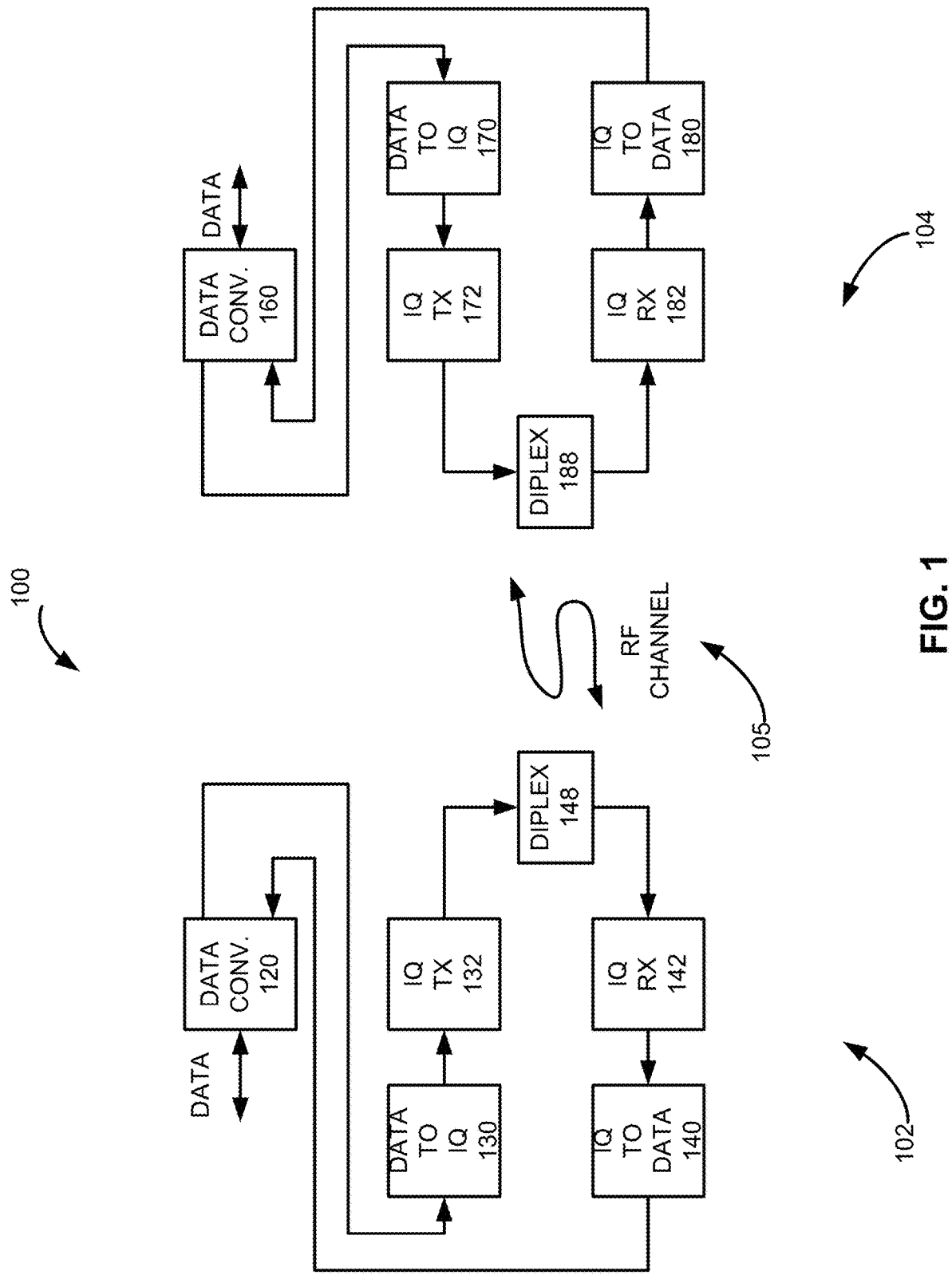
FIG. 1 illustrates a point-to-point network connection according to an embodiment of the present invention.

FIG. 1 illustrates a point-to-point network connection according to an embodiment of the present invention. This figure, as with the other included figures, are shown for explanatory purposes and do not limit either the possible embodiments of the present invention or the claims.

Point-to-point network connection circuit 100 can include connection circuitry 102 that can communicate with connection circuitry 104 over RF channel 105. For example, connection circuitry 102 can provide data to connection circuitry 104 over RF channel 105. Data converter 120 can receive data from a computer, server, local area network, or other computing device or network. Data converter 120 can provide data to data-to-IQ circuit 130. The data-to-IQ circuit 130 can split data received from data converter 120 into in-phase and quadrature signal components. IQ transmitter 132 can receive the in-phase and quadrature signal components and provide an RF signal for transmitting over RF channel 105 via diplex 148.

Connection circuitry 102 can also receive data from connection circuitry 104 over RF channel 105. For example, RF data can be received by IQ receiver 142 from RF channel 105 via diplex 148. IQ receiver 142 can receive the transmitted in-phase and quadrature signal components. The received in-phase and quadrature signal components can be demodulated and combined by IQ-to-data converter 140, which can provide an output to data converter 120. Data converter 120 can provide data to the computer, server, local area network, or other computing device or network.

Connection circuitry 104 can similarly provide data to connection circuitry 102 over RF channel 105. Data converter 160 can receive data from a computer, server, local area network, or other computing device or network. Data converter 160 can provide data to data-to-IQ circuit 170. The data-to-IQ circuit 170 can split data received from data converter 160 into in-phase and quadrature signal components. IQ transmitter 132 can receive the in-phase and quadrature signal components and provide an RF signal for transmitting over RF channel 105 via diplex 188.

Connection circuitry 104 can similarly receive data from connection circuitry 102 over RF channel 105. For example, RF data can be received by IQ receiver 182 from RF channel 105 via diplex 188. IQ receiver 182 can receive the in-phase and quadrature signal components. The received in-phase and quadrature signal components can be demodulated and combined by IQ-to-data converter 140, which can provide an output to data converter 160. Data converter 120 can provide data to the computer, server, local area network, or other computing device or network.

In these and other embodiments of the present invention, data converter 120 can receive and provide data consistent with various standard and proprietary protocols. For example, data converter 120 can provide and receive data consistent with one of the universal serial bus standards, such as USB 2, USB 3, or USB 4. Similarly, data converter 160 can receive and provide data consistent with various standard and proprietary protocols. Data converter 160 and data converter 120 can provide and receive data consistent with the same or different standard or proprietary protocols. This example can be used to provide a point-to-point link between two computers, servers, local area networks, or other computing devices or networks.

Further embodiments of the present invention can provide point-to-point network connections having an RF link with minimal latency. For example, a first network or network portion at a first location can wirelessly connect to a second network or network portion at a second location. Devices on each network or network portion can communicate using one of the universal serial bus (USB) standards, such as USB 2, USB 3, USB 4, or other standard or proprietary signal protocol. But this can make implementing a wireless link between the first network or network portion and the second network or network portion difficult to implement. For example, an excess amount of latency or dropout can cause a break in the RF link connection. This amount of excess latency can be as short as more than one bit-time.

To reduce latency, these and other embodiments of the present invention can implement fully transparent data transmission. To achieve full transparency, data can be translated between USB 2.0 data and fiber-optic data. The translation to fiber-optic data can provide data having a data rate and a modulation that can also be used by the RF link, thereby reducing the latency that could otherwise occur if the data needed to be translated to a different data rate or modulation scheme. The RF link can also utilize the same packet structure as the fiber-optic data, thereby greatly reducing the latency that could otherwise be caused by the necessity of reformatting data.

An example of such a technology that can be used to implement the RF link is Free Space Optics (FSO.) Such an RF link can be capable of using the same modulation techniques for wireless transmission and fiber-optic transmission. Such a link can further employ the same data rate, for example 1.25 Gbps, and the same packet structure for wireless transmission as for fiber-optic transmission. This can provide transparent transmission that is has a predictable throughput and very low latency. For example, the latency can be as low as one bit time. The use of a transparent wireless link can allow fiber-optic data to readily be provided from the first network or network portion to the second network or network portion. An example of such an RF link and associated circuitry is shown in the following figure.

Figure 2:
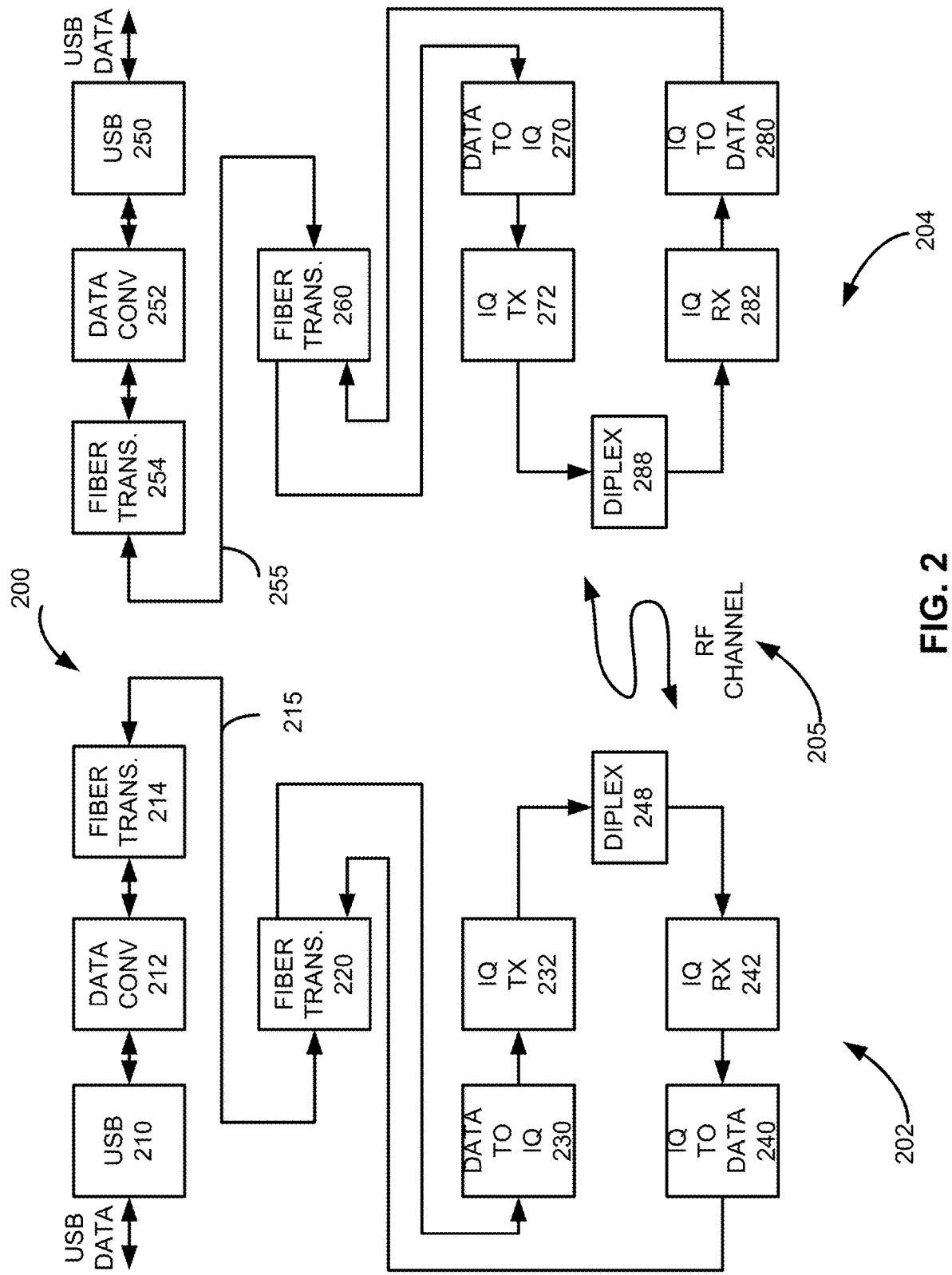
FIG. 2 illustrates circuitry for using a fiber-optic point-to-point link as part of a wireless point-to-point link according to an embodiment of the present invention.

FIG. 2 illustrates circuitry for using a fiber-optic point-to-point link as part of a wireless point-to-point link according to an embodiment of the present invention. In this example, connection circuitry 202 can communicate with connection circuitry 204 via RF channel 205. USB data can be received by USB interface 210. The data can be converted to a format suitable for fiber-optic transmission by data converter 212. Specifically, data converter 212 can modulate and format data from USB interface 210. This data can be formatted for fiber-optic transmission by fiber-optic transceiver 214. Fiber-optic transceiver 214 can provide fiber-optic data on fiber-optic cable 215.

In a fiber-optic point-to-point connection, fiber-optic transceiver 214 can provide data over fiber-optic cable 215 directly to fiber-optic transceiver 254 in connection circuitry 204. But in this example, it can be desirable to utilize wireless communication technologies. Accordingly, data from fiber-optic transceiver 214 can be received over fiber-optic cable 215 by fiber-optic transceiver 220.

In these and other embodiments of the present invention, wireless technologies can be utilized to form a transparent wireless link. An example of such a technology is Free Space Optics (FSO.) Such a link can be capable of using the same modulation techniques for wireless transmission and fiber-optic transmission. Such a link can further employ the same data rate, for example 1.25 Gbps, and packet structure for wireless transmission as for fiber-optic transmission. This can provide transparent transmission that is has a predictable throughput and very low latency. For example, the latency can be as low as one bit time. The use of a transparent wireless link can allow fiber-optic data to readily be provided from connection circuitry 202 to connection circuitry 204.

Data provided by fiber-optic transceiver 220 can be modulated in a manner and at a data rate that allows the data to be wirelessly transmitted. Further, the data provided by fiber-optic transceiver 220 can be formatted in packets that can be wirelessly transmitted. This can allow fiber-optic transceiver 220 to seamlessly communicate with both the data-to-IQ circuit 230 and the IQ-to-data converter 240. That is, the modulation, data rate, and packet format provided by data converter 212 can be used over both the fiber-optic cable 215 and the wireless data path through RF channel 205. This can reduce latency that might otherwise be incurred during additional modulation and packet formatting steps.

Fiber-optic transceiver 220 can provide data to data-to-IQ circuit 230. The data-to-IQ circuit 230 can split data received from fiber-optic transceiver 220 into in-phase and quadrature signal components. IQ transmitter 232 can receive the in-phase and quadrature signal components and provide an RF signal for transmitting over RF channel 205 via diplex 248.

Connection circuitry 202 can also receive data from connection circuitry 204 over RF channel 205. For example, RF data can be received by IQ receiver 242 from RF channel 205 via diplex 248. IQ receiver 242 can receive the in-phase and quadrature signal components. The received in-phase and quadrature signal components can be demodulated and combined by IQ-to-data converter 240, which can provide an output to fiber-optic transceiver 220. Fiber-optic transceiver 220 can provide data over fiber-optic cable 215 to fiber-optic transceiver 214. It should be noted that fiber-optic cable 215, and fiber-optic cable 255, can be one or two individual fibers. Fiber-optic transceiver 214 can provide data to data converter 212, which can provide USB data over USB interface 210 to the computer, server, local area network, or other computing device or network.

Connection circuitry 204 can similarly provide data to connection circuitry 202 over RF channel 205. USB data can be received by USB interface 250. The data can be converted to a format suitable for fiber-optic transmission by data converter 252. Fiber-optic transceiver 254 can provide fiber-optic data on fiber-optic cable 255.

As before, in a fiber-optic point-to-point connection, fiber-optic transceiver 254 can provide data over fiber-optic cable 255 directly to fiber-optic transceiver 214 in connection circuitry 204. But in this example, it can be desirable to utilize wireless communication technologies. Accordingly, data from fiber-optic transceiver 254 can be received over fiber-optic cable 255 by fiber-optic transceiver 260. Fiber-optic transceiver 260 can provide data to data-to-IQ circuit 270.

Again, wireless technologies, such as Free Space Optics (FSO) can allow fiber-optic transceiver 260 to seamlessly communicate with both the data-to-IQ circuit 270 and the IQ-to-data converter 280.

Data provided by fiber-optic transceiver 260 can be modulated in a manner and at a data rate that allows the data to be wirelessly transmitted. Further, the data provided by fiber-optic transceiver 260 can be formatted in packets that can be wirelessly transmitted. This can allow fiber-optic transceiver 220 to seamlessly communicate with both the data-to-IQ circuit 230 and the IQ-to-data converter 240. That is, the modulation, data rate, and packet format provided by data converter 252 can be used over both the fiber-optic cable 255 and the wireless data path through RF channel 205. This can reduce latency that might otherwise be incurred during additional modulation and packet formatting steps.

The data-to-IQ circuit 270 can split data received from fiber-optic transceiver 260 into in-phase and quadrature signal components. IQ transmitter 272 can receive the in-phase and quadrature signal components and provide an RF signal for transmitting over RF channel 205 via diplex 288.

Connection circuitry 204 can similarly receive data from connection circuitry 202 over RF channel 205. For example, RF data can be received by IQ receiver 282 from RF channel 205 via diplex 288. IQ receiver 282 can receive the in-phase and quadrature signal components. The received in-phase and quadrature signal components can be demodulated and combined by IQ-to-data converter 280, which can provide an output to fiber-optic transceiver 260. Fiber-optic transceiver 260 can provide data over fiber-optic cable 255 to fiber-optic transceiver 254. Fiber-optic transceiver 254 can provide data to data converter 252, which can provide USB data over USB interface 250 to the computer, server, local area network, or other computing device or network.

In these and other embodiments of the present invention, USB interface 210 can handle data consistent with other standard and propriety protocols, and data converter 212 can receive and provide data consistent with various standard and proprietary protocols. For example, data converter 212 can provide and receive data consistent with one of the universal serial bus standards, such as USB 2, USB 3, or USB 4. Similarly, USB interface 250 can handle data consistent with other standard and propriety protocols, and data converter 252 can receive and provide data consistent with various standard and proprietary protocols. USB interface 210 and data converter 212 and USB interface 250 and data converter 252 can provide and receive data consistent with the same or different standard or proprietary protocols.

Figure 3:
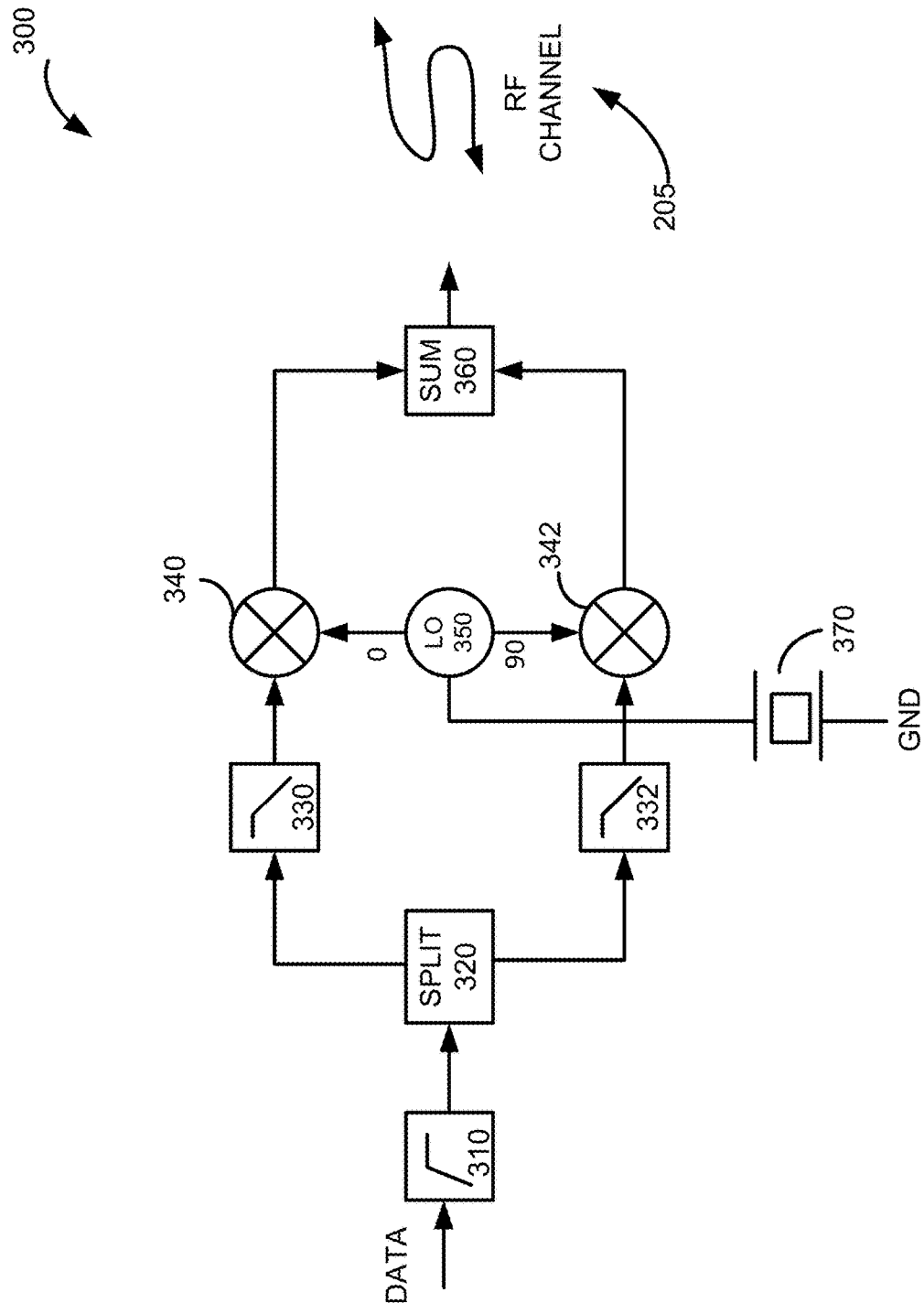
FIG. 3 illustrates a transmitter according to an embodiment of the present invention.

FIG. 3 illustrates a transmitter according to an embodiment of the present invention. Transmitter 300 can be used as data-to-IQ circuit 130 or 170 and IQ transmitter 132 or 172 in FIG. 1, or as data-to-IQ circuit 230 or 270 and IQ transmitter 232 or 272 in FIG. 2. Transmitter 300 can include high-pass filter 310. High-pass filter 310 can be formed of a series capacitor or other components. High-pass filter 310 can serve as a DC block for phase splitter 320. Phase splitter 320 can be a zero-degree phase splitter that provides the data signal to low-pass filter 330 and low-pass filter 332, respectively. Crystal 370 can set a frequency for local oscillator 350. First mixer 340 can receive an output from low-pass filter 330 and the in-phase local-oscillator signal from local oscillator 350. Second mixer 342 can receive an output from low-pass filter 332 and the quadrature local-oscillator signal from local oscillator 350. The outputs of first mixer 340 and second mixer 342 can be summed by summing circuitry 360 and provided to diplex 248 (shown in FIG. 2) and transmitted over RF channel 205.

Embodiments of the present invention can provide RF receivers having self-tuning capabilities. The first example below can provide self-tuning by detecting a first envelope of a first demodulated output signal and a second envelope of a second demodulated output signal. One of the detected envelopes can be subtracted from the other and the difference can be filtered to generate a control signal. The control signal can be applied to a voltage-controlled crystal oscillator. In-phase and quadrature outputs of the voltage-controlled crystal oscillator can be used to demodulate a received signal to generate the first and second demodulated output signals.

Figure 4:
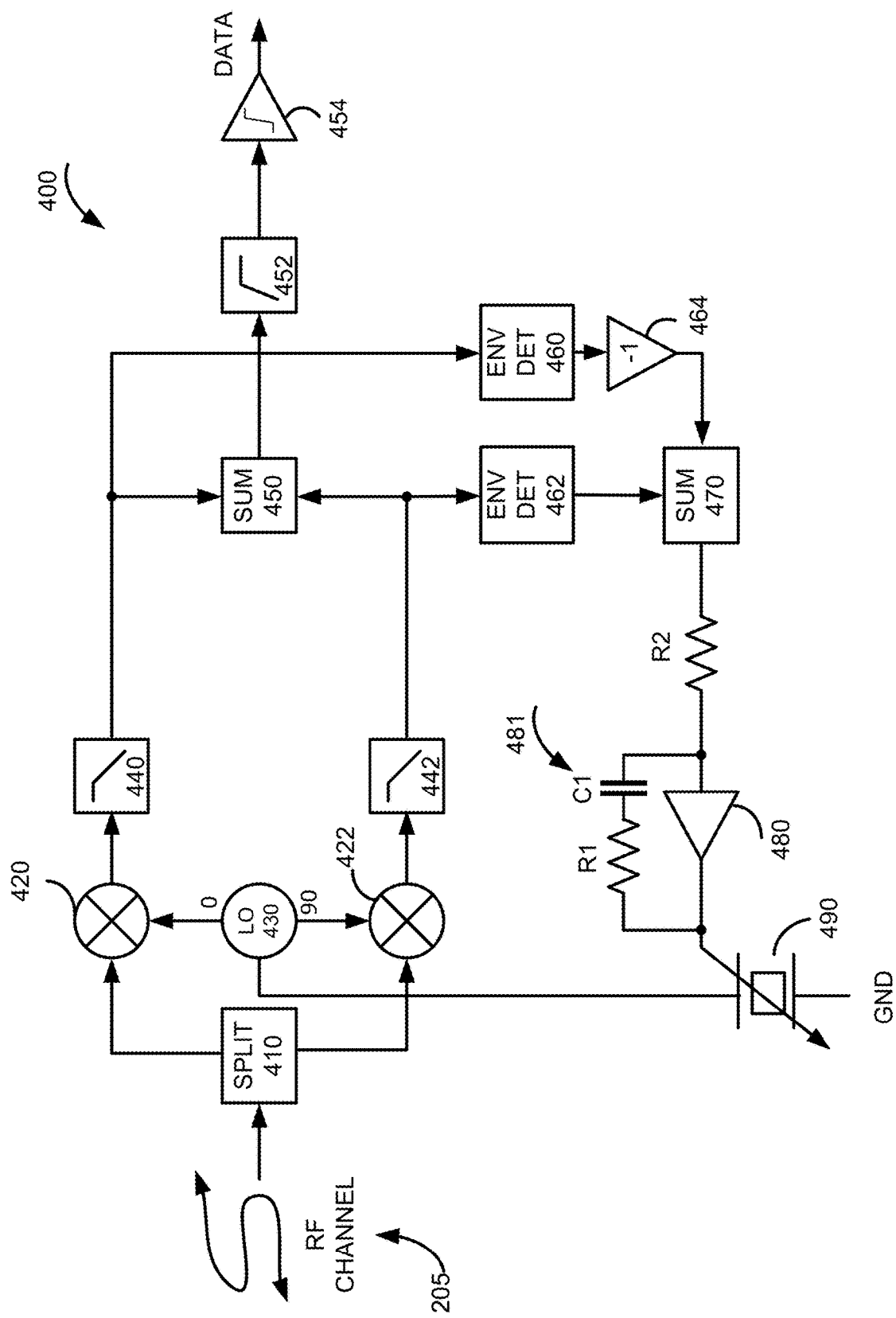
FIG. 4 illustrates a receiver according to an embodiment of the present invention.

FIG. 4 illustrates a receiver according to an embodiment of the present invention. Receiver 400 (or 700, 800, or 900) can be used as IQ receiver 142 or 182 and IQ to data converter 140 or 180 in FIG. 1, or as IQ receiver 242 or 282 and IQ to data converter 240 or 280 in FIG. 2. Receiver 400 can include zero-degree phase splitter 410 to receive an RF input signal from RF channel 205 via diplex 248 (shown in FIG. 2.) Phase splitter 410 can provide the RF signal to first mixer 420 and to second mixer 422. First mixer 420 can be referred to here as the in-phase mixer since it receives the in-phase local oscillator signal and second mixer 422 can be referred to as the quadrature mixer since it receives the quadrature local oscillator signal. Crystal 490 can provide a frequency input to local oscillator 430. Crystal 490 and local oscillator 430 can form a voltage-controlled local oscillator. First mixer 420 can receive the RF signal and the in-phase component of the local-oscillator signal from local oscillator 430 and can provide a first demodulated output signal. Second mixer 422 can receive the RF signal and the quadrature component of the local-oscillator signal from local oscillator 430 and can provide a second demodulated output signal. The output of first mixer 420 can be filtered by low-pass filter 440 and provided to summing circuit 450. The output of second mixer 422 can be filtered by low-pass filter 442 and provided to summing circuit 450. The first demodulated output signal and the second demodulated output signal can be in-phase signals with the same content. Since the noise between them can be uncorrelated, adding them (after filtering in this example) can increase the signal-to-noise ratio at the output of summing circuit 450. Summing circuit 450 can provide a signal to high-pass filter 452. High-pass filter 452 can remove the DC component from the signal at the output of summing circuit 450. High-pass filter 452 can provide an output to comparator 454, which can provide output data.

In these and other embodiments of the present invention, such as the embodiments shown in FIG. 1 and FIG. 2, connection circuitry 102 or 202 and connection circuitry 104 or 204 can be in separate buildings or other separate locations. As such, crystal 370 in transmitter 300 (both shown in FIG. 3) and crystal 490 in receiver 400 might not be matched to the same frequency. That is, crystal 490 might be tuned at a frequency that is different from a frequency at which crystal 370 is tuned. A difference between these two frequencies can be a difference frequency, where the difference frequency can be referred to as a beat frequency. The presence of such a mismatch and a resulting beat frequency can cause signals demodulated by receiver 400 to be modulated by this first frequency. As a result, it can be desirable to tune crystal 490 such that it operates at a frequency that matches the frequency of operation for crystal 370 in transmitter 300.

That is, when a frequency of in-phase and quadrature outputs of voltage-controlled crystal oscillator 350 in transmitter 300 (both shown in FIG. 3) mismatches a frequency of in-phase and quadrature outputs of voltage-controlled crystal oscillator 430 in receiver 400, the demodulated output waveform can be modulated by the beat frequency, where the beat frequency is the difference in frequency between the receiver local oscillator 350 and the transmitter local oscillator 430. Accordingly, embodiments of the present invention can provide a feedback loop to adjust the frequency of in-phase and quadrature outputs of voltage-controlled crystal oscillator 430 in receiver 400 to match the frequency of in-phase and quadrature outputs of voltage-controlled crystal oscillator 350 in transmitter 300. When these frequencies match, the beat frequency goes to zero. The loop gain when the beat frequency is at zero can be dependent on the amplitude of the envelope of the demodulated waveforms provided by first mixer 420 and second mixer 422, which can be referred to as the beat frequency waveforms. That is, the higher the received amplitude, the higher the loop gain. A high loop gain can make the loop unstable and prone to overshooting and oscillations. A low loop gain can undesirably increase loop response time. Accordingly, embodiments of the present invention can include one or more circuit, methods, or apparatus to reduce this sensitivity to the amplitude of the envelope of the demodulated waveform.

Accordingly, embodiments of the present invention can provide circuits, methods, and apparatus that can detect the presence of this beat frequency and use the beat frequency to generate a control voltage that adjusts a frequency of crystal 490 to match the frequency of crystal 370. In this example, envelope detector 460 can be used to detect an envelope of the first demodulated output signal provided by first mixer 420. More specifically, envelope detector 460 can detect an envelope of the output of first filter 440, though this filter can be ignored here for simplicity. Similarly, envelope detector 462 can be used to detect an envelope of the second demodulated output signal provided by second mixer 422. More specifically, envelope detector 462 can detect an envelope of the output of second filter 442, though this filter can be ignored here for simplicity. A difference between the output of envelope detector 460 and the output of envelope detector 462 can be found by inverter 464 and summing circuitry 470. The output of summing circuitry 470 can be provided to control circuit 481 that can be used to adjust a frequency of operation for crystal 490. Control circuit 481 can be configured to help to stabilize the frequency tuning feedback loop in receiver 400 as shown below.

Receiver 400 can include a feedback loop that adjusts the frequency of operation for crystal 490. Specifically, local oscillator 430 can provide in-phase and quadrature components of a local-oscillator signal to first mixer 420 and second mixer 422 respectively. The outputs of first mixer 420 and second mixer 422 can be filtered by low-pass filter 440 and low-pass filter 442, respectively. The envelopes of these first and second demodulated output signals can be detected by envelope detector 460 and envelope detector 462. A difference between these signals can be used to adjust a frequency of operation for crystal 490, which in turn drives local oscillator 430. In this loop, the local oscillator 430 can provide a pole, as can the envelope detectors 460 and 462. The presence of these two poles in the feedback loop can cause excessive phase shift, which could lead oscillations. Accordingly, control circuit 481 can include amplifier 480 having an input resistor R2 and a feedback network including resistor R1 in series with capacitor C1. Capacitor C1 and its associated resistors R1 and R2 can form a zero (more specifically a pole in a feedback loop around amplifier 480) that can decrease the phase shift at frequency to help compensate the tuning feedback loop of receiver 400 and reduce the likelihood of oscillations. Capacitor C1 and resistors R1 and R2 can also set a gain of the feedback loop in receiver 400. Excessive gain can also lead to instability, while a low gain can cause the loop to lock after an excessive amount of time. Examples of waveforms that are present in receiver 400 are shown in the following figure.

Figure 5:
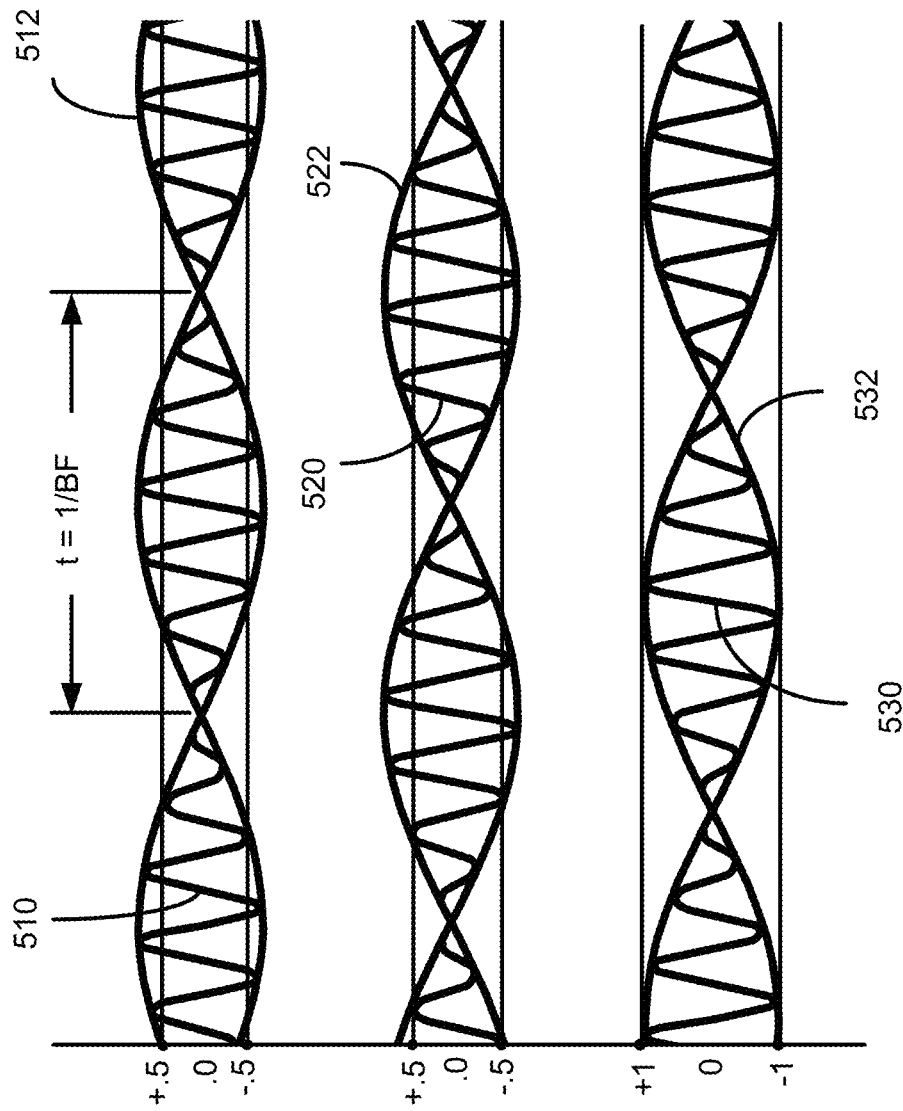
FIG. 5 illustrates waveforms at various nodes of the receive circuitry of FIG. 4.

FIG. 5 illustrates waveforms at various nodes of the receive circuitry of FIG. 4. First demodulated output signal 510 provided by first mixer 420 (shown in FIG. 4) can have an envelope 512. Second demodulated output signal 520 provided by second mixer 422 (shown in FIG. 4) can have envelope 522. The difference between first demodulated output signal 510 and second demodulated output signal 520 can be difference signal 530. The difference between the envelope 512 and envelope 522 can be envelope 532. The waveform of envelope 532 can be provided to control circuit 481 (shown in FIG. 4), which can tune a frequency of crystal 490 in receiver 400 to match the frequency of crystal 370 in transmitter 300. In this example, envelope 512 and envelope 522 can each have an amplitude of 1.4 Volts peak-to-peak, resulting in envelope 532 having an amplitude of 2 Volts peak-to-peak. The beat frequency in this example can be BF, and the period of modulation of the first demodulated output signal provided by first mixer 420 and the second demodulated output signal provided by second mixer 422 can be the reciprocal of BF as shown. Further details are shown in the following figure.

Figure 6A:
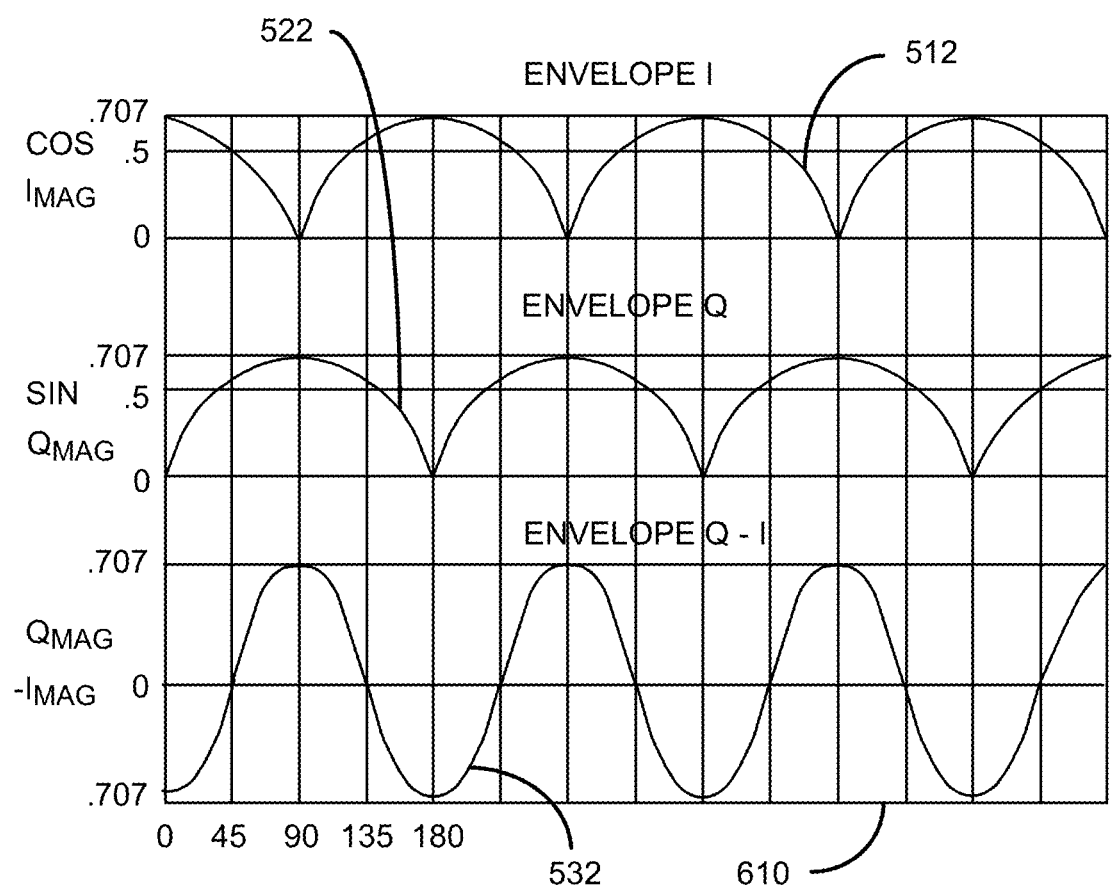
Figure 6B:
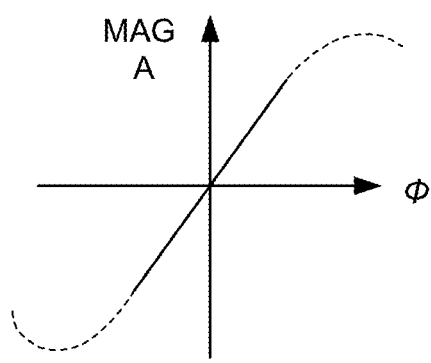
FIG. 6B illustrates a transfer function of a control voltage as a function of phase error for the feedback loop.

FIG. 6A illustrates waveforms in a feedback loop in the receiver of FIG. 4, while FIG. 6B illustrates a transfer function of a control voltage as a function of phase error for the feedback loop. In FIG. 6A, the magnitude of envelope 512 (shown in FIG. 5) of the first demodulated output signal provided by first mixer 420 is shown as a function of phase along X axis 610. Since first mixer 420 receives the in-phase local oscillator signal, the envelope of its output can be referred to as the in-phase envelope. The magnitude of envelope 522 of the second demodulated output signal provided by second mixer 422 is shown as a function of phase along X axis 610. Since second mixer 422 receives the quadrature local oscillator signal, the envelope of its output can be referred to as the quadrature envelope. The difference between envelope 522 and envelope 512 is envelope 532, which is also shown as a function of phase along X axis 610. In this example, the amplitude of the magnitude of envelope 512 and the amplitude of the magnitude of envelope 522 can be 0.7 volts, while the amplitude of the magnitude of difference envelope 532 can be 1.4 Volts.

FIG. 6B illustrates a transfer function of a control voltage amplitude as a function of phase error for the feedback loop of the receiver of FIG. 4. The transfer function, or loop gain, is graphed as a magnitude of a control signal provided by control circuit 481 to crystal 490 (shown in FIG. 4) as a function of phase error between the local-oscillator signal generated by crystal 490 in receiver 400 and crystal 370 in transmitter 300 (shown in FIG. 3.)

The transfer function, and therefore the loop gain, of the feedback loop of receiver 400 is approximately linear for a range of phase errors. But the amplitude of envelope 512 and envelope 522, and therefore the loop gain itself, or the magnitude of the transfer function, is dependent on the amplitude of the signal received by receiver 400. This can result in stability problems and inconsistent response times. For example, excess gain can cause stability problems, while too little gain can cause the loop to lock only after an excessive amount of time. Accordingly, these and other embodiments of the present invention can provide feedback loops for receivers that have a reduced gain dependency on received signal strength. Examples are shown in the following figures.

Figure 7:
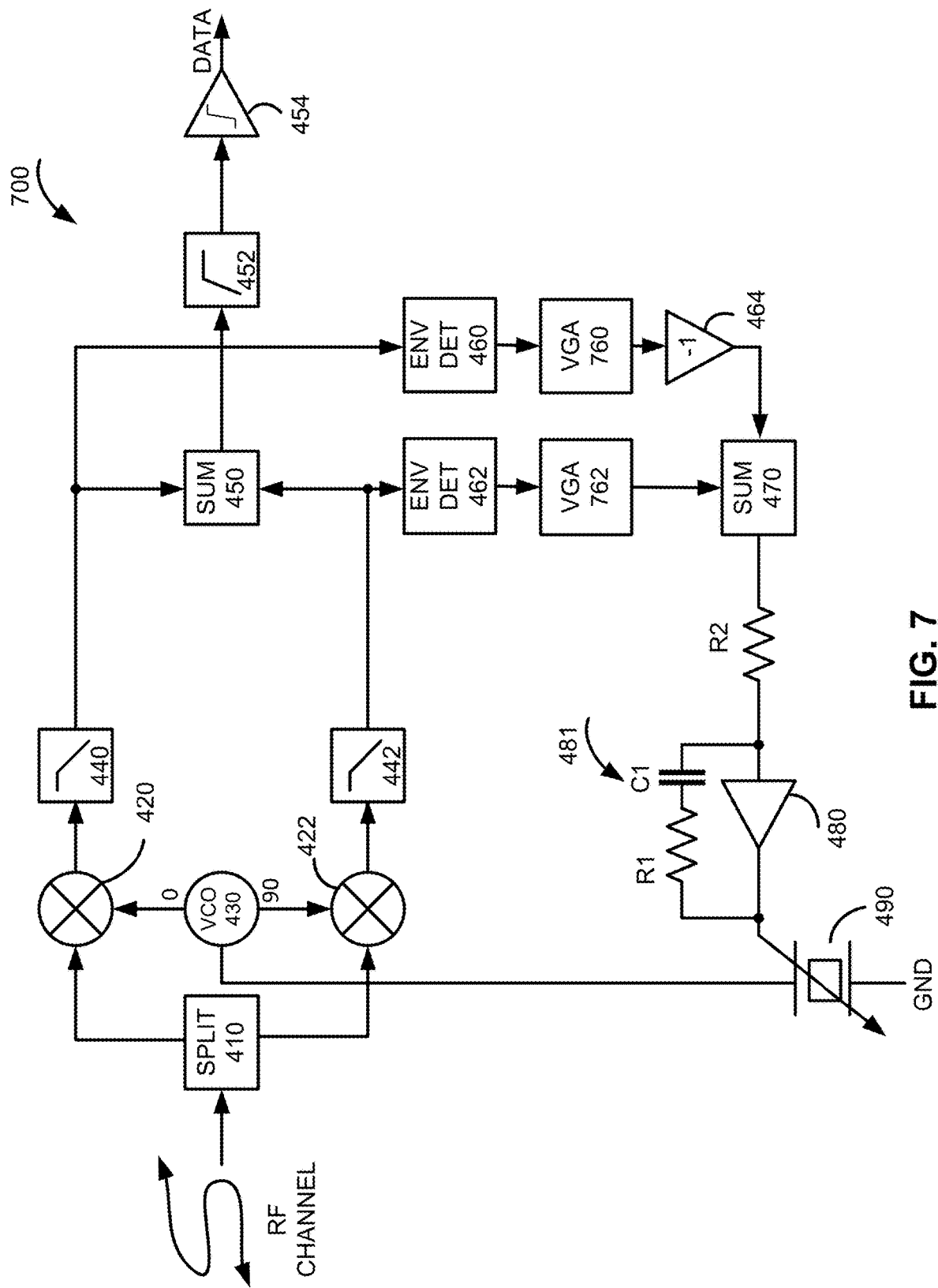
FIG. 7 illustrates a receive circuit having a self-tuning feedback loop with a loop gain having reduced dependency on received signal strength.

FIG. 7 illustrates a receive circuit having a self-tuning feedback loop with a loop gain having reduced dependency on received signal strength. Receiver 700 can include zero-degree phase splitter 410 to receive an RF input signal from RF channel 205 via diplex 248 (shown in FIG. 2.) Phase splitter 410 can provide the received RF signal to first mixer 420 and to second mixer 422. Crystal 490 can provide a frequency input to local oscillator 430. Crystal 490 and local oscillator 430 can form a voltage-controlled local oscillator. First mixer 420 can receive the RF signal and the in-phase component of the local-oscillator signal from local oscillator 430. Second mixer 422 can receive the RF signal and the quadrature component of the local-oscillator signal from local oscillator 430. The output of first mixer 420, the first demodulated output signal, can be filtered by low-pass filter 440 and provided to summing circuit 450. The output of second mixer 422, the second demodulated output signal, can be filtered by low-pass filter 442 and provided to summing circuit 450. Summing circuit 450 can provide a signal to high-pass filter 452. The first demodulated output signal and the second demodulated output signal can be in-phase signals with the same content. Since the noise between them can be uncorrelated, adding them (after filtering in this example) can increase the signal-to-noise ratio at the output of summing circuit 450. High-pass filter 452 can remove the DC component from the signal at the output of summing circuit 450. High-pass filter 452 can provide an output to comparator 454, which can provide output data.

Envelope detector 460 can detect an envelope of the first demodulated output signal provided by first mixer 420. More specifically, envelope detector 460 can detect an envelope of the output of first filter 440, though this filter can be ignored here for simplicity. Similarly, envelope detector 462 can detect an envelope of the second demodulated output signal provided by second mixer 422. More specifically, envelope detector 462 can detect an envelope of the output of second filter 442, though this filter can be ignored here for simplicity. The output of envelope detector 460 can be received by variable-gain amplifier 760, while the output of envelope detector 462 can be received by variable-gain amplifier 762. A difference between the output of variable-gain amplifier 760 and variable-gain amplifier 762 can be found by inverter 464 and summing circuitry 470. That is, the output of variable-gain amplifier 762 can be added to the inverse of the output of variable-gain amplifier 760. The output of summing circuitry 470 can be provided to control circuit 481 that can be used to adjust a frequency of operation for crystal 490. Control circuit 481 can be configured to help to stabilize the frequency tuning feedback loop in receiver 400.

In this configuration, the self-tuning feedback loop can be from the input signal and in-phase and quadrature outputs of the voltage-controlled crystal oscillator, or more specifically the outputs of local oscillator 430, through in-phase first mixer 420 and quadrature second mixer 422, through envelope detector 460 and envelope detector 462, variable-gain amplifier 762 and variable-gain amplifier 760, and back to the voltage-controlled crystal oscillator including crystal 490 and local oscillator 430. This loop can include variable-gain amplifier 760 and variable-gain amplifier 762 in the feedback loop, though a variable-gain amplifier can be inserted in the input signal receive path instead. For example, a variable-gain amplifier (not shown) can gain an input signal to a set level that is provided to in-phase and quadrature mixers in the input path. Variable-gain amplifiers (not shown) can be placed after the mixers and between the mixers and the envelope detectors. Variable-gain amplifier 760 and variable-gain amplifier 762 can be placed after envelope detector 460 and envelope detector 462, as shown in this example.

Variable-gain amplifier 760 and variable-gain amplifier 762 can be configured to adjust the amplitudes of the detected envelopes of the first demodulated output signal provided by first mixer 420 and the second demodulated output signal provided by second mixer 422 that are at least somewhat independent of the amplitude of the signal received by phase splitter 410. This can simplify the compensation of the self-tuning feedback loop in receiver 700. It can also improve the consistency of the response times of the self-tuning feedback loop.

In these and other embodiments of the present invention, other circuits can be used instead of envelope detectors and variable-gain amplifiers. For example, logarithmic amplifiers can be connected after the envelope detectors. That is, a first logarithmic amplifier can follow an envelope detector for the first demodulated output signals and a second logarithmic amplifier can follow an envelope detector for the second demodulated output signal. These logarithmic amplifiers can be simple, p-n junction-based amplifiers. The logarithmic amplifiers can provide the logarithm of the outputs of the envelope detectors. A difference between the outputs of the logarithmic amplifiers can be generated using an inversion and a summing circuit, or by other method.

The difference between two logarithmic outputs is the logarithm of the ratio of the two outputs. In this circuit, the difference between the outputs of the two logarithmic amplifiers can be equal to the logarithm of the ratio of the first demodulated output signal and the second demodulated output signal. These and other embodiments of the present invention can utilize this by subtracting one of the outputs of the logarithmic amplifiers from the other. Since the amplitude of the first demodulated output signal and the second demodulated output signals can both similarly track the amplitude of the input signal, their ratio, and the logarithm of their ratio, can be substantially independent of the amplitude of the input signal. The difference in the outputs of the logarithmic amplifiers can thus be an amplitude-independent signal that can generate a control signal used to adjust a frequency of the voltage-controlled crystal oscillator. An example is shown in the following figure.

Figure 8:
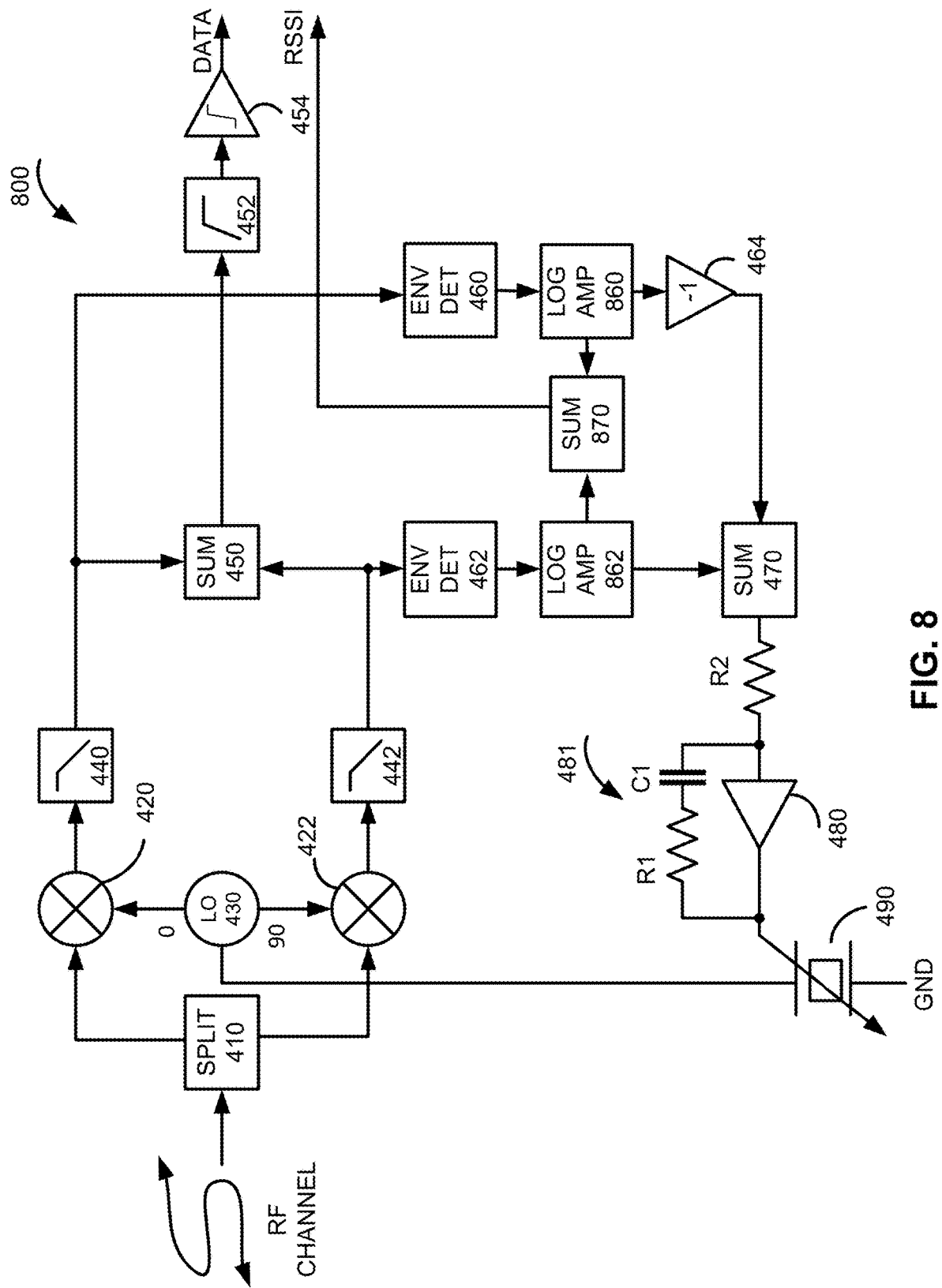
FIG. 8 illustrates a receive circuit having a self-tuning feedback loop with a loop gain having reduced dependency on received signal strength.

FIG. 8 illustrates a receive circuit having a self-tuning feedback loop with a loop gain having reduced dependency on received signal strength. Receiver 800 can include zero-degree phase splitter 410 to receive an RF input signal from RF channel 205 via diplex 248. Phase splitter 410 can provide the RF signal to first mixer 420 and to second mixer 422. Crystal 490 can provide a frequency input to local oscillator 430. Crystal 490 and local oscillator 430 can form a voltage-controlled local oscillator. First mixer 420 can receive the RF signal and the in-phase component of the local-oscillator signal from local oscillator 430. Second mixer 422 can receive the RF signal and the quadrature component of the local-oscillator signal from local oscillator 430. The output of first mixer 420, the first demodulated output signal, can be filtered by low-pass filter 440 and provided to summing circuit 450. The output of second mixer 422, the second demodulated output signal, can be filtered by low-pass filter 442 and provided to summing circuit 450. Summing circuit 450 can provide a signal to high-pass filter 452. The first demodulated output signal and the second demodulated output signal can be in-phase signals with the same content. Since the noise between them can be uncorrelated, adding them (after filtering in this example) can increase the signal-to-noise ratio at the output of summing circuit 450. High-pass filter 452 can remove the DC component from the signal at the output of summing circuit 450. High-pass filter 452 can provide an output to comparator 454, which can provide output data.

Envelope detector 460 can detect an envelope of the first demodulated output signal provided by first mixer 420. More specifically, envelope detector 460 can detect an envelope of the output of first filter 440, though this filter can be ignored here for simplicity. Similarly, envelope detector 462 can detect an envelope of the second demodulated output signal provided by second mixer 422. More specifically, envelope detector 462 can detect an envelope of the output of second filter 442, though this filter can be ignored here for simplicity. The output of envelope detector 460 can be received by logarithmic amplifier 860, while the output of envelope detector 462 can be received by logarithmic amplifier 862. A difference between the output of logarithmic amplifier 860 and logarithmic amplifier 862 can be found by inverter 464 and summing circuitry 470. The output of summing circuitry 470 can be provided to control circuit 481 that can be used to adjust a frequency of operation for crystal 490. Control circuit 481 can be configured to help to stabilize the frequency tuning feedback loop in receiver 400.

These and other embodiments of the present invention can also provide a received-signal-strength indication or RSSI output. An RSSI output can be used in aligning a receiving antenna to a radio source. That is, a receiving antenna can be pointed towards a radio source and positioned to find a maximum RSSI output amplitude. This aligning can be used to ensure that the strongest signal is received for the lowest bit error rate (BER.) In this example, the output of logarithmic amplifier 862 and the output of logarithmic amplifier 860 can be added together by summing circuitry 870. This sum is thus the logarithm of the products of the detected envelopes, which can be used as an RSSI signal.

Logarithmic amplifier 862 and logarithmic amplifier 860 can be simple, p-n junction-based amplifiers. Logarithmic amplifier 862 and logarithmic amplifier 860 can provide the logarithm of the outputs of the envelope detectors. One of the outputs of logarithmic amplifier 862 and logarithmic amplifier 860 can be subtracted from the other. The difference between two logarithmic outputs is the logarithm of the ratio of the two outputs. In this circuit, the difference between the outputs of logarithmic amplifiers 860 and 862 can be equal to the logarithm of the ratio of the first demodulated output signal provided by first mixer 420 and the second demodulated output signal provided by second mixer 422. These and other embodiments of the present invention can utilize this by subtracting one of the outputs of the logarithmic amplifiers 860 and 862 from the other. Since the amplitude of the first demodulated output signal and the second demodulated output signal can both similarly track the amplitude of the input signal, their ratio, and the logarithm of their ratio, can be substantially independent of the amplitude of the input signal. The difference in the outputs of the logarithmic amplifiers can thus be an amplitude-independent signal that can generate a control signal used to adjust a frequency of crystal 490.

In these and other embodiments of the present invention, demodulating logarithmic amplifiers can be used in place of envelope detectors and logarithmic amplifiers. These demodulating logarithmic amplifiers can be cascaded amplifiers configured to provide successive compression. These demodulating logarithmic amplifiers can be more complicated than the simpler p-n junction-based amplifiers used with the envelope detectors. The demodulating logarithmic amplifiers can convert the first and second demodulated output signals to decibel-scaled output voltages. Again, since the amplitude of the first demodulated output signal and the second demodulated output signals can both similarly track the amplitude of the input signal, their ratio, and the logarithm of their ratio, can be substantially independent of the amplitude of the input signal. The difference in the outputs of the demodulating logarithmic amplifiers can thus be an amplitude-independent signal that can generate a control signal used to adjust a frequency of the voltage-controlled crystal oscillator. An example utilizing a demodulating logarithmic amplifier is shown in the following figure.

Figure 9:
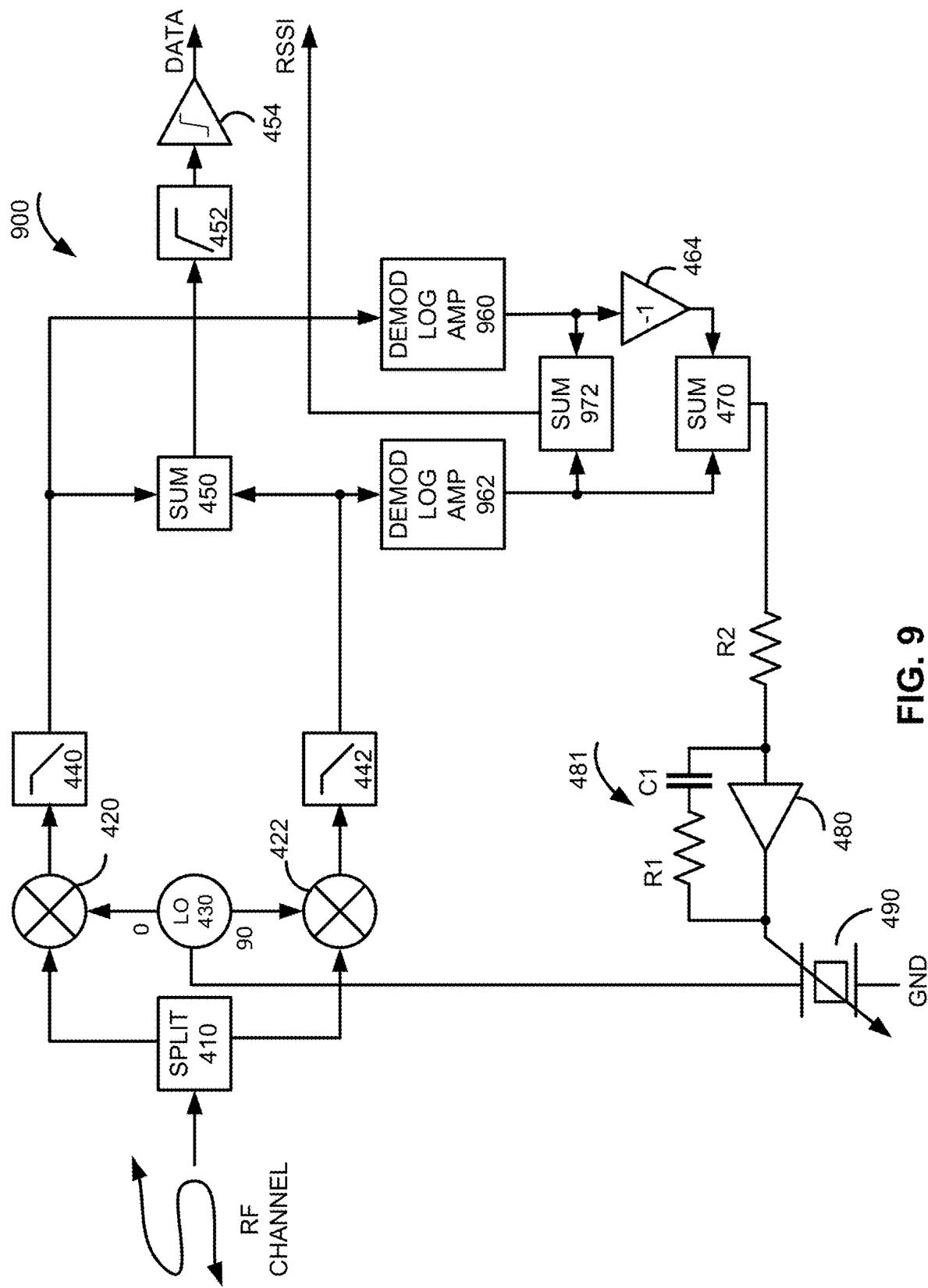
FIG. 9 illustrates a receive circuit having a self-tuning feedback loop with a loop gain having reduced dependency on received signal strength.

FIG. 9 illustrates a receive circuit having a self-tuning feedback loop with a loop gain having reduced dependency on received signal strength. Receiver 900 can include zero-degree phase splitter 410 to receive an RF input signal from RF channel 205 via diplex 248. Phase splitter 410 can provide the RF signal to first mixer 420 and to second mixer 422. Crystal 490 can provide a frequency input to local oscillator 430. Crystal 490 and local oscillator 430 can form a voltage-controlled local oscillator. First mixer 420 can receive the RF signal and the in-phase component of the local-oscillator signal from local oscillator 430. Second mixer 422 can receive the RF signal and the quadrature component of the local-oscillator signal from local oscillator 430. The output of first mixer 420, the first demodulated output signal, can be filtered by low-pass filter 440 and provided to summing circuit 450. The output of second mixer 422, the second demodulated output signal, can be filtered by low-pass filter 442 and provided to summing circuit 450. Summing circuit 450 can provide a signal to high-pass filter 452. The first demodulated output signal and the second demodulated output signal can be in-phase signals with the same content. Since the noise between them can be uncorrelated, adding them (after filtering in this example) can increase the signal-to-noise ratio at the output of summing circuit 450. High-pass filter 452 can remove the DC component from the signal at the output of summing circuit 450. High-pass filter 452 can provide an output to comparator 454, which can provide output data.

First demodulating logarithmic amplifier 960 can receive the first demodulated output signal from first mixer 420. More specifically, first demodulating logarithmic amplifier 960 can receive the output of first filter 440, though this filter can be ignored here for simplicity. Second demodulating logarithmic amplifier 960 can receive the first demodulated output signal from first mixer 420. More specifically, second demodulating logarithmic amplifier 960 can detect an envelope of the output of second filter 442, though this filter can be ignored here for simplicity. A difference between the output of demodulating logarithmic amplifier 960 and demodulating logarithmic amplifier 962 can be found by inverter 464 and summing circuitry 470. The output of summing circuitry 470 can be provided to control circuit 481 that can be used to adjust a frequency of operation for crystal 490. Control circuit 481 can be configured to help to stabilize the frequency tuning feedback loop in receiver 400.

These and other embodiments of the present invention can also provide a received-signal-strength indication or RSSI output. In this example, the output of demodulating logarithmic amplifier 960 and the output of demodulating logarithmic amplifier 962 can be added together by summing circuitry 972. This sum is thus the logarithm of the products of the detected envelopes, which can be used as an RSSI signal.

Demodulating logarithmic amplifier 960 and demodulating logarithmic amplifier 962 can be more complicated than the simpler p-n junction-based amplifiers that can be used with the envelope detectors in receiver 800 (shown in FIG. 8). Demodulating logarithmic amplifier 960 and demodulating logarithmic amplifier 962 can convert the first and second demodulated output signals to a decibel-scaled output voltage. Again, since the amplitude of the first demodulated output signal and the second demodulated output signals can both similarly track the amplitude of the input signal, their ratio, and the logarithm of their ratio, can be substantially independent of the amplitude of the input signal. The difference in the outputs of the demodulating logarithmic amplifiers can thus be an amplitude-independent signal that can generate a control signal used to adjust a frequency of crystal 490 in the voltage-controlled crystal oscillator.

Figure 10A:
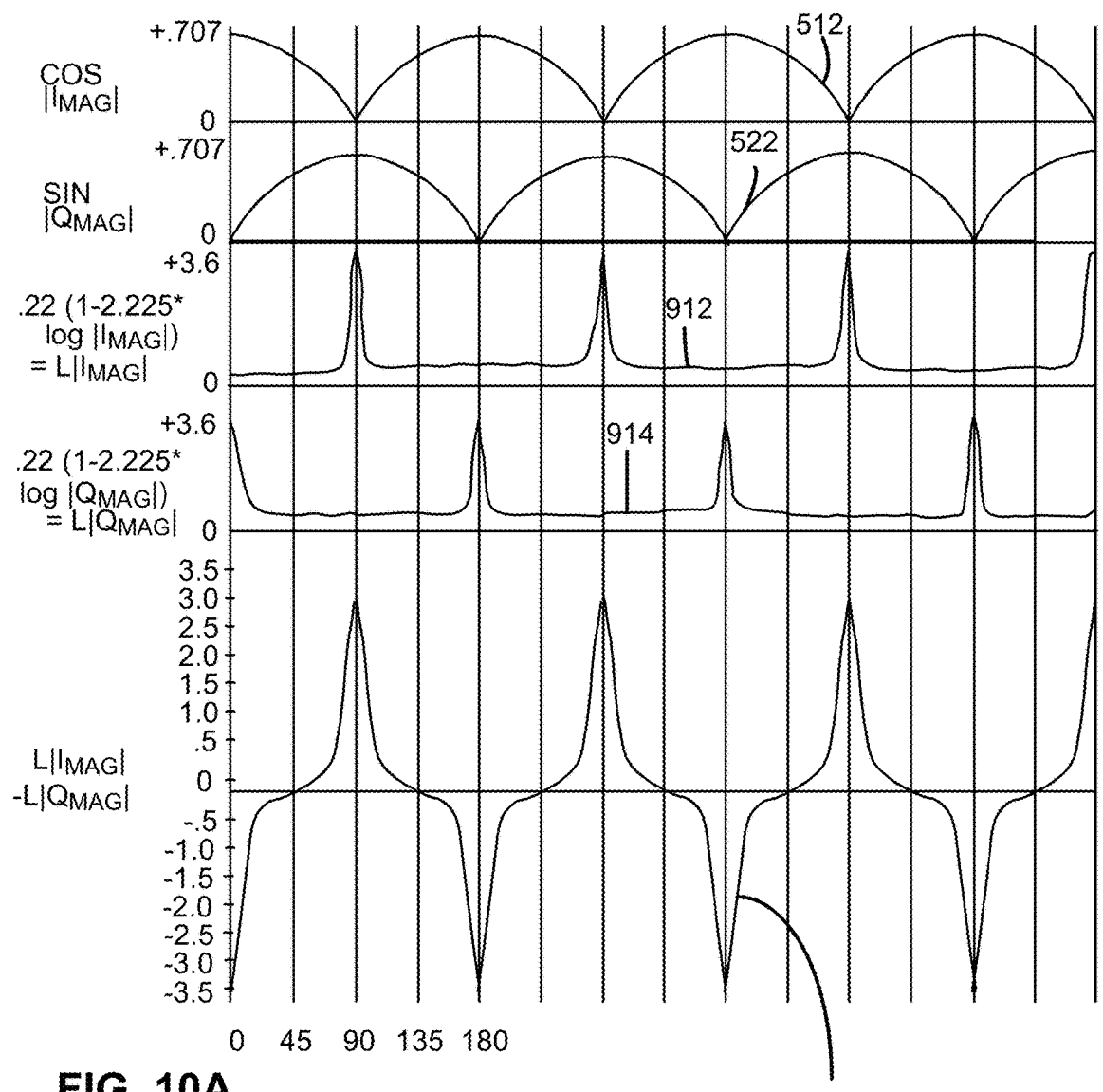
Figure 10B:
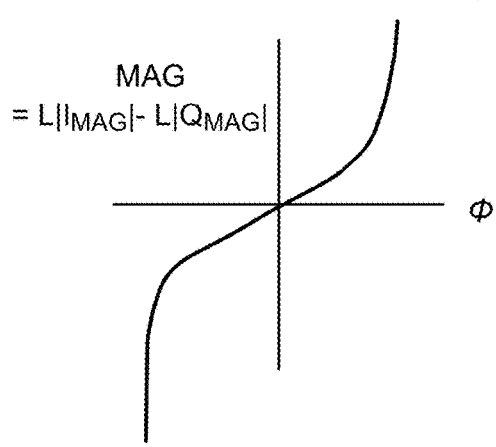
FIG. 10B illustrates a transfer function of a control voltage as a function of phase error for the feedback loop.

FIG. 10A illustrates waveforms in a feedback loop in the receiver of FIG. 9, while FIG. 10B illustrates a transfer function of a control voltage as a function of phase error for the feedback loop. In FIG. 10A, the envelope 512 of the first demodulated output signal provided by first mixer 420 (shown in FIG. 9) is shown as a function of phase along X axis 610. Since first mixer 420 receives the in-phase local oscillator signal, the envelope of its output can be referred to as the in-phase envelope. The envelope 522 of the second demodulated output signal provided by second mixer 422 (shown in FIG. 9) is shown as a function of phase along X axis 610. Since second mixer 422 receives the quadrature local oscillator signal, the envelope of its output can be referred to as the quadrature envelope. The output of demodulating logarithmic amplifier 960 is shown as waveform 912. The output of demodulating logarithmic amplifier 960 can track the logarithm of envelope 512. The output of demodulating logarithmic amplifier 962 is shown as waveform 914. The output of demodulating logarithmic amplifier 962 can track the logarithm of envelope 522. The difference between waveform 912 and waveform 914 is shown as waveform 916, which is also shown as a function of phase along X axis 610. The waveform 916 from 0 to 90 degrees can be the transfer function or loop gain for the self-tuning feedback loop of receiver 900 (shown in FIG. 9.)

FIG. 10B illustrates a transfer function of a control-voltage amplitude as a function of phase error for the feedback loop of the receiver of FIG. 9. The transfer function, or loop response, is graphed as a magnitude of a control signal provided by control circuit 481 to crystal 490 (shown in FIG. 9) as a function of phase error between the local-oscillator signal generated by crystal 490 in receiver 900 (shown in FIG. 9) and crystal 370 in transmitter 300 (shown in FIG. 3.)

These and other embodiments of the present invention can employ one or more types of mixers. For example, some or all of the mixers can be double-balanced mixers, single-balanced mixers, ring-diode mixers, Gilbert multipliers, or other types of mixers. The local oscillators and other voltage-controlled oscillators can be ring oscillators, tank circuits, or other types of oscillators. The receivers and transmitters can be formed on a single integrated circuit, or they can be implemented as a combination of different circuits. The demodulating logarithmic detectors can be implemented using the AD8318 manufactured by Analog Devices of Norwood, MA, or other similar or otherwise appropriate demodulating logarithmic detectors.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A self-tuning radio-frequency (RF) receiver comprising:
   a first circuit to receive an RF input signal and to provide a first RF output signal and a second RF output signal;
   a tunable crystal;
   a voltage-controlled oscillator (VCO) coupled to the tunable crystal and to provide a first VCO output and a second VCO output, wherein the first VCO output and the second VCO output are quadrature signals;
   a first mixer to receive the first RF output signal and the first VCO output;
   a second mixer to receive the second RF output signal and the second VCO output;
   a first demodulating logarithmic amplifier coupled to an output of the first mixer;
   a second demodulating logarithmic amplifier coupled to an output of the second mixer;
   a first summing circuit to provide a difference between an output of the first demodulating logarithmic amplifier and an output of the second demodulating logarithmic amplifier; and
   a control circuit coupled to an output of the first summing circuit and having an output coupled the tunable crystal.

2. The receiver of claim 1 wherein the first demodulating logarithmic amplifier is a cascaded amplifier.

3. The receiver of claim 2 wherein the first demodulating logarithmic amplifier is configured to provide successive compression to an input signal.

4. The receiver of claim 3 wherein the first circuit is a zero-degree phase splitter.

5. The receiver of claim 4 further comprising a second summing circuit to provide a sum of an output of the first demodulating logarithmic amplifier and an output of the second demodulating logarithmic amplifier and to provide a received-signal strength indication.

6. The receiver of claim 5 further comprising:
   a third summing circuit to sum the output of the first mixer and the output of the second mixer; and
   a comparator coupled to an output of the third summing circuit to provide a data output.

7. The receiver of claim 6 further comprising:
   a first low-pass filter coupled to the output of the first mixer;
   a second low-pass filter coupled to the output of the second mixer; and
   a high-pass filter coupled to the output of the third summing circuit.

8. The receiver of claim 7 wherein the control circuit comprises an amplifier having a feedback network comprising a series resistor and capacitor.

9. A self-tuning radio-frequency (RF) receiver comprising:
   a first circuit to receive an RF input signal and to provide a first RF output signal and a second RF output signal;
   a tunable crystal;
   a voltage-controlled oscillator (VCO) coupled to the tunable crystal and to provide a first VCO output and a second VCO output, wherein the first VCO output and the second VCO output are quadrature signals;
   a first mixer to receive the first RF output signal and the first VCO output and to provide a first demodulated output signal;
   a second mixer to receive the second RF output signal and the second VCO output and to provide a second demodulated output signal;
   a first logarithmic amplifier coupled to an output of the first mixer;
   a second logarithmic amplifier coupled to an output of the second mixer;
   a first summing circuit to provide a difference between an output of the first logarithmic amplifier and an output of the second logarithmic amplifier; and
   a control circuit coupled to an output of the first summing circuit and having an output coupled the tunable crystal.

10. The receiver of claim 9 further comprising:
    a first envelope detector coupled between the output of the first mixer and the first logarithmic amplifier; and
    a second envelope detector coupled between the output of the second mixer and the second logarithmic amplifier.

11. The receiver of claim 10 wherein the first circuit is a zero-degree phase splitter.

12. The receiver of claim 11 further comprising a second summing circuit to provide a sum of an output of the first logarithmic amplifier and an output of the second logarithmic amplifier and to provide a received-signal strength indication.

13. The receiver of claim 12 further comprising:
    a third summing circuit to sum the output of the first mixer and the output of the second mixer; and
    a comparator coupled to an output of the third summing circuit to provide a data output.

14. The receiver of claim 13 further comprising:
    a first low-pass filter coupled to the output of the first mixer;
    a second low-pass filter coupled to the output of the second mixer; and
    a high-pass filter coupled to the output of the third summing circuit.

15. The receiver of claim 14 wherein the control circuit comprises an amplifier having a feedback network comprising a series resistor and capacitor.

16. The receiver of claim 10 wherein the first logarithmic amplifier is a first demodulating logarithmic amplifier and the second logarithmic amplifier is a second demodulating logarithmic amplifier.

* * * * *